Figure 1:
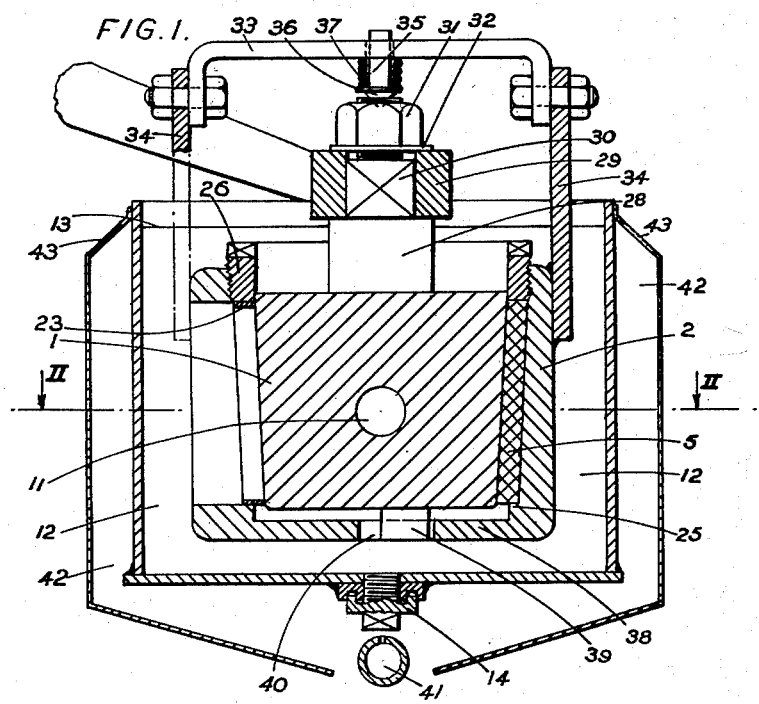

Inventor
Harry Hill
by Sydney Beckinsale
Stebbins Blenko + Webb
Attorney

Aug. 1, 1950 H. HILL ET AL 2,517,311
VALVE FOR CONTROLLING THE FLOW OF MOLTEN METALS
Filed Jan. 5, 1946 2 Sheets-Sheet 2
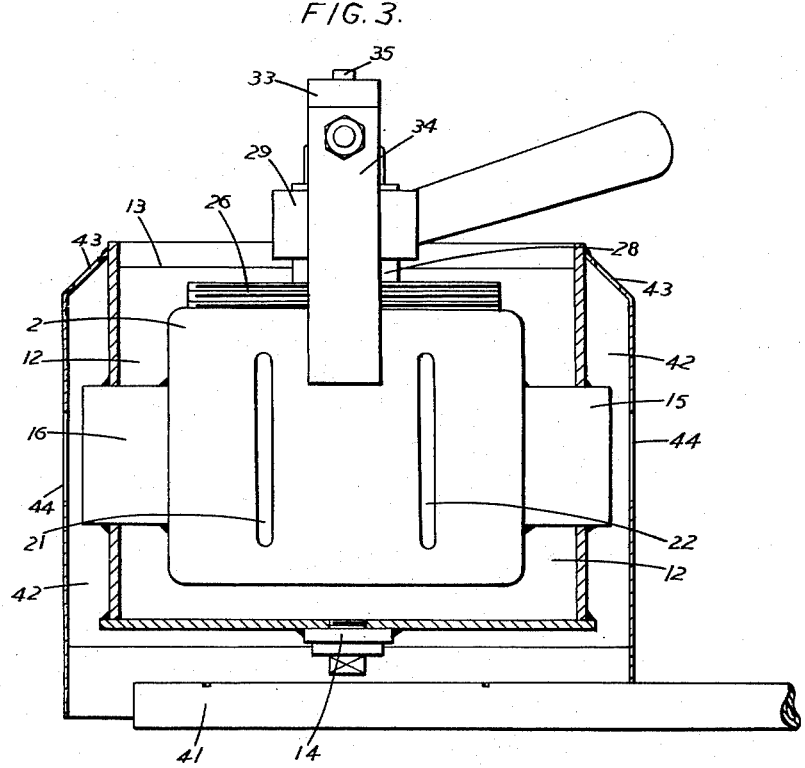
FIG. 3.
FIG. 4.
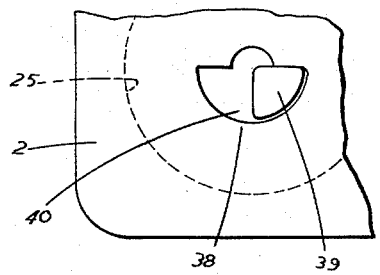
Inventor
Harry Hill
by Sydney Beckinsale
Stebbins Blenko & Webb
Attorney Patented Aug. 1, 1950

2,517,311

UNITED STATES PATENT OFFICE 2,517,311

VALVE FOR CONTROLLING THE FLOW OF MOLTEN METALS

Harry Hill and Sydney Beckinsale, London, England, assignors to British Insulated Callender's Cables Limited, London, England, a British company Application January 5, 1946, Serial No. 639,485
In Great Britain February 1, 1945

4 Claims. (Cl. 251—113)

The invention relates to valves for controlling the flow of molten metal, particularly intended for use in controlling the passage of molten lead from a melting pot, or from a vessel into which it has passed after melting. A principal object of the invention is to provide a valve for this purpose which protects the molten metal passing through it against leakage of air past the surfaces of the valve into contact with the metal.

In this improved valve the moving member, which opens and closes an orifice in a fixed member by sliding over the surfaces thereof, works in a bath of molten metal in which it is submerged and which is distinct from the mass of metal to be controlled. This moving member lies between and slides over two opposed faces and has an aperture in it which is adapted to be moved into and out of register with apertures in the opposed faces so as to provide a clear passage through the valve between these apertures or to cut off this passage. The moving member is preferably actuated by a member which extends upwards out of the bath. It is preferably arranged that the moving valve member is submerged at all parts of its movement so that its surface cannot carry air down to the working faces of the valve. A clamping arrangement is preferably provided to secure close engagement between the faces of the moving and fixed members of the valve.

A facing of suitable non-metallic heat-resisting material may be provided on one of the relatively sliding surfaces of the valve members, preferably on the stationary member. The object of this provision is to secure that there is no, or practically no, rubbing contact here between the metallic surfaces, where those surfaces are made of such metal that an action similar in effect to seizure of the rubbing surfaces may occur. It appears that this is due, at least in part, to the molten metal of the bath producing a kind of soldering action, for instance, if the metal is tin each of the rubbing surfaces may become tinned and then the two adjacent layers of tin may unite. A suitable non-metallic facing material is compressed asbestos, which may include a binding material. The facing may be secured in place on its member to ensure no relative movement between them, for instance by providing, on the back of the facing, projections to fit into recesses in the adjacent metal surface.

Figure 2:
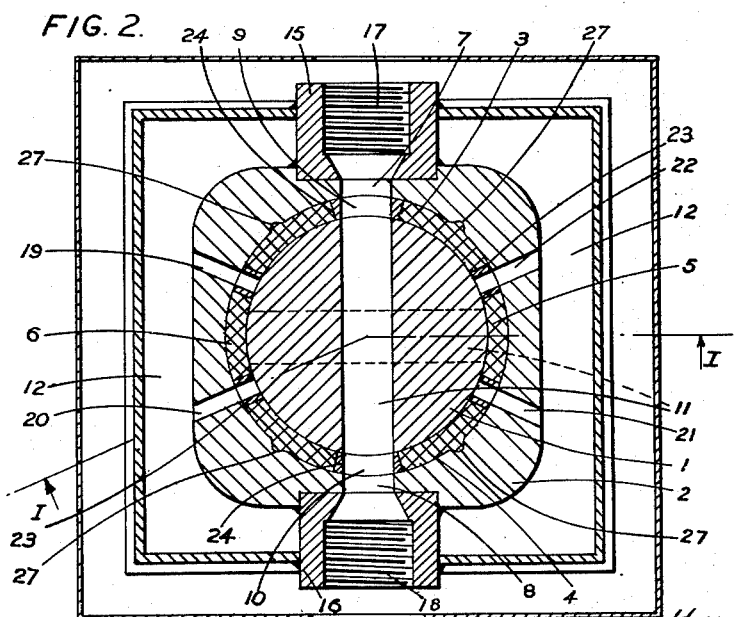

The invention is further described hereinafter with reference by way of example to the accompanying drawings, wherein, Figure 1 is a sectional elevation of a valve on the line I—I in Figure 2, Figure 2 is a sectional view from above, the section being taken on the line II—II in Figure 1, Figure 3 is an elevation, partly in section, of the valve seen in the direction of the arrow III in Figure 1, and Figure 4 is a view from below of a portion of the arrangement.

In the form of valve illustrated the moving member 1 is a plug of circular cross-section adapted to be turned about its vertical axis. The plug is slightly tapered with the largest diameter uppermost, and works under continual endwise pressure in a corresponding socket formed in the fixed member 2. The socket is lined with a facing material, of compressed asbestos incorporating a binding material and graphite, arranged in four pieces 3, 4, 5 and 6 which substantially cover the wall of the socket. The fixed member 2, comprising an integral body of metal of rectangular shape, is provided with diametrically placed holes 7 and 8 passing through the wall of the fixed member into the socket. The parts 3 and 4 of the facing adjacent to these holes are provided with apertures 9 and 10 similar in shape and size and forming extensions of the holes 7 and 8 in the fixed member. The fixed surfaces adjacent to the apertures 9 and 10 constitute two opposed curved faces over which slides the moving member 1 as this member is turned about its vertical axis. A passage 11 passes transversely through the plug 1 and is adapted to register with the holes in the fixed member. In one position, shown in full line in the drawings, the alignment of the holes in the fixed member with the passage in the moving member provides for uninterrupted flow through the valve. By turning the moving member 1 through 90°, the passage 11 is moved into the position shown by the broken lines in Figure 2, whereby it is completely out of register with the ports 7 and 8 in the fixed member so that the valve is closed.

The arrangements above described are completely surrounded by a bath 12 adapted to contain molten metal to a level 13 whereby the valve is completely submerged. The moving part of the valve is thus submerged at all parts of its movement so that air cannot be carried to the working faces of the valve and thence into contact with the metal controlled by the valve. The bath 12 is in the form of a rectangular container, open at the top, and provided with a drain plug 14 to facilitate emptying. The valve is supported in, and located with reference to the bath 12 by two metal bridge pieces 15 and 16, attached to the fixed part of the valve and extending through the walls of the bath. The bridge pieces are welded or otherwise joined in a fluid-tight manner with the adjacent parts of the bath. The bridge pieces 15 and 16 are bored to form holes 17 and 18 in alignment with the apertures in the fixed member so that when the valve is in the open position there is an uninterrupted passage between those holes 17 and 18. These holes may be internally threaded to facilitate connection with containers or receptacles for molten metal, the flow of which is to be controlled by the valve.

Four radial slots 19, 20, 21 and 22 extend from the outside of the fixed part 2 to the inner surface of the socket. They extend vertically over the full length of the relatively movable surfaces. The facing pieces 3, 4, 5 and 6 are limited to the surfaces of the socket lying between the slots which are thereby extended to the surface of the moving member 1. The slots secure access of molten metal in the bath 12 to the surface of moving member between the positions of the transverse passage 11 in the open and closed conditions, thereby to prevent any creepage of air from the outlet, between the moving and fixed parts, to the metal in the passage 11 and perhaps to the metal at the entrance to the valve. In order to prevent fraying of the edges of the facing pieces adjacent the inner ends of the radial slots 19, 20, 21 and 22, which might obstruct the passage through the slots, those edges are faced with metal strip eyelets 23. Similarly annular metal eyelets 24 protect the edges of the facings adjacent to the main openings 7 and 8 on the inside wall of the socket.

An annular lip 25 formed around the lower part of hte socket serves to retain the facing material against downward movement. An upper extension of the socket is internally threaded to receive a tightening ring 26, which, when screwed into place, bears upon the top of the facing material to hold it firmly in position. The facing material may be secured against rotation by providing on the back of the material projections 27 fitting into corresponding recesses in the adjacent metal surface of the socket. The upper part or stem of the movable member 1 projects upward out of the bath and is in three portions. The first portion 28 adjacent to the plug rises above the liquid level 13 and its upper face forms a seating for a spanner 29. The next portion 30 is shaped to accommodate the spanner 29 so that by positive engagement the movement of the spanner effects movement of the movable part 1. The upper portion is threaded to receive a nut 31 whereby the spanner 29 may be clamped between a washer 32 and the seating on the first mentioned portion 28. The spanner 29 is thus located above the level of molten metal in the bath 12; it is suitably formed as shown to clear the upper edges of the bath and may be of any convenient shape and length to keep the operator away from the region of hot metal. Extending diametrically across the bath 12 is a cross bar 33 bolted at each end to an upright 34 the lower end of which is fixed to the outside of the fixed part 2 of the valve. A plunger 35, in alignment with the axis of the movable part 1 of the valve, is freely movable in a vertical direction in a hole in the cross-bar 33. The lower end of the plunger 35 is formed with an enlarged head 36, which is pressed against the end of the uppermost part of the movable member 1 by a compressed helical spring 37 surrounding the plunger 35, and bearing at one end against the under side of the cross-bar 33 and at the other end against the upper side of the enlarged head 36. A clamping effect is thus obtained to maintain the movable member 2 under continual downward pressure, to secure close engagement between the relatively moving surfaces of the valve.

The lower end of the socket, below the annular lip 25, is closed by a wall 38 leaving above it a clearance space to permit endwise movement of the plug 1 within the required limits. Integral with, and extending downwards from, the lower end of the plug is a quadrant shaped projection 39 (see Figure 4). This extends into a substantially semi-circular aperture 40 formed in the closure wall 38, and is adapted, by engagement with the appropriate edges of the aperture 40, to determine the limits of movement of movable member 1 in each direction, and particularly to ensure that in the open condition the transverse passage 11 is in proper alignment with the fixed openings.

Heating arrangements are preferably provided to maintain metal molten in the bath 12. For instance a gas burner 41 may be arranged below the bath which is enclosed by a sheet metal envelope 42 extending from below the bath and round the four sides thereof. Hot gases from the burner will circulate through the envelope and escape through apertures 43 at the top. The walls of the envelope are apertured 44 to permit access to the bridge pieces 15 and 16. If desired, the metal in the bath may be retained in the molten state while the metal to be controlled by the valve is solidifying on cooling down of the associated plant. It is preferable to use a metal in the bath different from that to be controlled, for instance, the valve for controlling the flow of molten lead may work in a bath of tin.

What we claim as our invention is:

1. A valve for controlling the flow of molten metal, comprising a fixed member having two opposed surfaces and having an inlet aperture in one surface and an outlet aperture in the other surface, a movable member lying between the opposed surfaces, having surfaces in sliding contact with the opposed surfaces, having an aperture extending between the surfaces of sliding contact, and movable relative to the fixed member to bring the apertures in the fixed and movable members into and out of register to provide a passage between the inlet and outlet apertures in the fixed member and to cut off this passage and separate from said passage, a bath extending below and above the fixed member to contain molten metal to a depth to submerge the movable member.

2. A valve for controlling the flow of molten metal, comprising a fixed member having two opposed surfaces, an inlet aperture in one surface and an outlet aperture in the other surface, an apertured movable member lying between the opposed surfaces, having surfaces slidable relative to these opposed surfaces and movable relative to the fixed member to bring the apertures in the members into and out of register to open and close the valve, a bath separate from the said passage and adapted to contain molten metal to a depth to submerge the movable member, and a facing of non-metallic heat-resisting material on the sliding surfaces of one of the members.

3. A valve for controlling the flow of molten metal, comprising a tapered plug of circular cross-section having a transverse aperture, a fixed member having a socket of circular cross-section lined with non-metallic heat-resisting material, having diametrically opposed inlet and outlet apertures, and tapered to receive the plug, the plug being rotatable in the socket to bring the transverse aperture into and out of register with the diametrically opposed apertures to open and close the valve, and surrounding the fixed member a bath separate from the passage through the valve and adapted to contain molten metal to a depth to submerge the plug.

4. A valve for controlling the flow of molten metal, comprising a tapered plug of circular cross-section having a transverse aperture, a fixed member having a socket of circular cross-section lined with non-metallic heat-resisting material, having diametrically opposed inlet and outlet apertures, and tapered to receive the plug, the plug being rotatable in the socket to bring the transverse aperture into and out of register with the diametrically opposed apertures to open and close the valve, a bath surrounding the fixed member adapted to contain molten metal to a depth to submerge the plug, and the fixed member having passages extending radially through the wall of the socket from the bath to the curved surface of the plug.

HARRY HILL.
SYDNEY BECKINSALE.

REFERENCES CITED

The following references are of record in the file of this patent:

UNITED STATES PATENTS

| Number | Name | Date |
|---|---|---|
| 1,448,359 | Dittman | Mar. 13, 1923 |
| 1,461,520 | Mansfield | July 10, 1923 |
| 1,856,430 | Roesen | May 3, 1932 |
| 1,888,207 | Bard | Nov. 22, 1932 |
| 2,023,765 | Mansfield | Dec. 10, 1935 |

FOREIGN PATENTS

| Number | Country | Date |
|---|---|---|
| 3,357 | Great Britain | of 1891 |
| 55,632 | Germany | Mar. 12, 1891 |
| 115,572 | Great Britain | May 16, 1918 |